(12) United States Patent
Shiotsu et al.

(10) Patent No.: US 12,169,596 B2
(45) Date of Patent: Dec. 17, 2024

(54) INFORMATION PROCESSING APPARATUS, SYSTEM, AND METHOD THAT EXTRACTS A VIBRATION PARAMETER FOR VIBRATION CONTROL BASED ON A SCENE OF INPUT CONTENT

(71) Applicant: DENSO TEN Limited, Kobe (JP)

(72) Inventors: Shinichi Shiotsu, Kobe (JP); Yoshikuni Miki, Kobe (JP); Rei Hiromi, Kobe (JP); Yohei Kakee, Kobe (JP); Iku Nakajo, Kobe (JP); Kazuma Hashimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 122 days.

(21) Appl. No.: 17/698,678

(22) Filed: Mar. 18, 2022

(65) Prior Publication Data

US 2023/0098809 A1    Mar. 30, 2023

(30) Foreign Application Priority Data

Sep. 30, 2021 (JP) ................. 2021-161742
Sep. 30, 2021 (JP) ................. 2021-161743
Sep. 30, 2021 (JP) ................. 2021-161744
Feb. 9, 2022  (JP) ................. 2022-018701

(51) Int. Cl.
  *G06F 3/01*   (2006.01)
  *G06F 3/16*   (2006.01)
  *G06V 20/40*  (2022.01)
  *H04R 1/02*   (2006.01)
  *H04R 3/00*   (2006.01)

(52) U.S. Cl.
  CPC .............. *G06F 3/016* (2013.01); *G06F 3/011* (2013.01); *G06F 3/16* (2013.01); *G06V 20/40* (2022.01); *H04R 1/028* (2013.01); *H04R 3/00* (2013.01); *H04R 2499/15* (2013.01)

(58) Field of Classification Search
  CPC . G06F 3/016; G06F 3/011; G06F 3/16; G06V 20/40; H04R 1/028; H04R 3/00; H04R 2499/15
  See application file for complete search history.

(56) References Cited

U.S. PATENT DOCUMENTS

| | | | |
|---|---|---|---|
| 2013/0106691 A1* | 5/2013 | Rank ................... | A63F 13/5255 345/156 |
| 2014/0133681 A1* | 5/2014 | Mizuta .................... | A63F 13/54 381/300 |
| 2017/0136354 A1* | 5/2017 | Yamano ................ | G06F 1/1632 |
| 2020/0234475 A1* | 7/2020 | Du .......................... | G06N 5/02 |
| 2021/0248835 A1* | 8/2021 | Wiley .................... | G06T 19/006 |
| 2021/0256821 A1* | 8/2021 | Nakagawa ................ | G06F 3/01 |

FOREIGN PATENT DOCUMENTS

JP    2004081357 A   *   3/2004

* cited by examiner

*Primary Examiner* — Terrell M Robinson
(74) *Attorney, Agent, or Firm* — Oliff PLC

(57) ABSTRACT

An information processing apparatus includes a control unit configured to execute a scene detection process, a parameter extraction process, and an output process. The scene detection process detects a scene from an input content. The parameter extraction process extracts a realistic sensation parameter for wave control that corresponds to a scene that is detected by the scene detection process. The output process outputs a wave signal for the content that is produced by processing sound data of the input content by a realistic sensation parameter that is extracted by the parameter extraction process.

17 Claims, 10 Drawing Sheets

FIG.4

Figure 1:
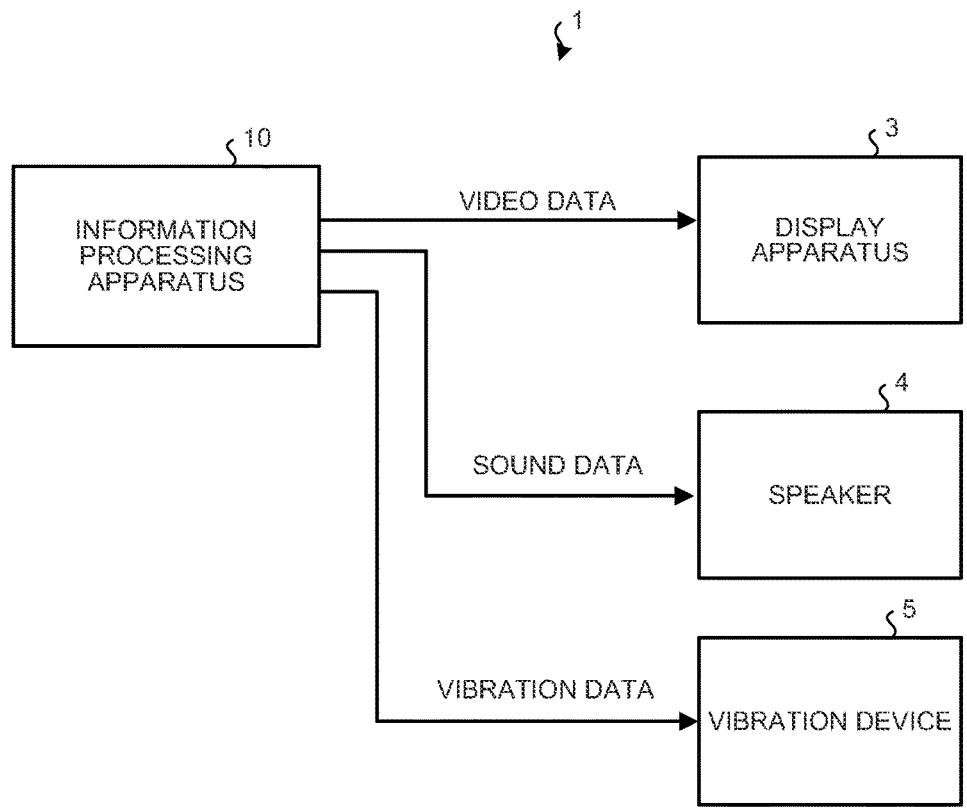

| DETECTION SCENE | CONDITION CATEGORY | TARGET | CONDITION PARAMETER | THRESHOLD | CONDITIONAL EXPRESSION |
|---|---|---|---|---|---|
| SCENE A | POSITIONAL RELATIONSHIP BETWEEN USER AND TARGET | OBJECT 1 | DISTANCE (d) | 10 m | d < THRESHOLD |
| SCENE B | POSITIONAL RELATIONSHIP BETWEEN USER AND TARGET | OBJECT 2 | ANGLE (s) | 30 degrees | a < THRESHOLD |
| SCENE C | MOVEMENT OF USER | USER | VELOCITY (v) | 100 km/h | v > THRESHOLD |
| SCENE D | MOVEMENT OF USER | USER | ACCELERATION (q) | 1q | q > THRESHOLD |
| SCENE E | MOVEMENT OF USER | USER | ROTATIONAL VELOCITY (r) | 10 degrees/s | r > THRESHOLD |
| SCENE F | SPACE WHERE USER IS PRESENT | SPACE 1 | INSIDE OF SPACE | - | In SPACE 1 |
| SCENE G | SPACE WHERE USER IS PRESENT | SPACE 1, OBJECT 3 | PRESENCE / QUANTITY OF OBJECT | 10 | (QUANTITY OF OBJECT in SPACE 1) > THRESHOLD |
| SCENE H | SPACE WHERE USER IS PRESENT | CONTENT 1 | STARTING TIME (t1) – ENDING TIME (t2) | 10 seconds – 30 seconds | t1 < REPRODUCTION TIME < t2 |
| SCENE W | SOUND IS GENERATED FROM TARGET | OBJECT 4 | DISTANCE (d) SOUND PATTERN | 20 m | d < THRESHOLD AND SOUND PATTERN IS SIMILAR TO PATTERN w |
| SCENE X | SOUND IS GENERATED FROM TARGET | OBJECT 5 | DISTANCE (d) SOUND PATTERN | 20 m | d < THRESHOLD AND SOUND PATTERN IS SIMILAR TO PATTERN x |
| SCENE Y | SOUND IS GENERATED FROM TARGET | OBJECT 6 | DISTANCE (d) SOUND PATTERN | 20 m | d < THRESHOLD AND SOUND PATTERN IS SIMILAR TO PATTERN y |
| SCENE Z | SOUND IS GENERATED FROM TARGET | OBJECT 6 | DISTANCE (d) SOUND PATTERN | 20 m | d < THRESHOLD AND SOUND PATTERN IS SIMILAR TO PATTERN z |
| ⋮ | ⋮ | ⋮ | ⋮ | ⋮ | ⋮ |

FIG.5

| DETECTION SCENE | CONDITIONAL EXPRESSION | CONDITION CATEGORY |
|---|---|---|
| SCENE I | AND CONDITION | SCENES A, C |
| SCENE J | AND CONDITION | SCENES C, F |
| SCENE K | AND CONDITION | SCENES A, B, E |
| SCENE L | OR CONDITION | SCENES A, C |
| ... | ... | ... |

FIG.6

| DETECTION SCENE | CONDITIONAL EXPRESSION | CONDITION PARAMETER |
|---|---|---|
| SCENE M | AND CONDITION | SCENES A, C |
| SCENE N | AND CONDITION | SCENES C, F |
| SCENE P | AND CONDITION | SCENES A, B, E |
| SCENE O | OR CONDITION | SCENES A, C |
| ... | ... | ... |

FIG.7

| RULE NUMBER | PRIORITY ORDER RULE |
|---|---|
| 1 | PRIORITIZE SCENE THAT IS DETECTED PREVIOUSLY |
| 2 | PRIORITIZE SCENE THAT IS DETECTED SUBSEQUENTLY (SWITCH WHEN SUBSEQUENT SCENE IS PROVIDED) |
| 3 | PRIORITIZE ONE WITH GREATER WEIGHT OF PARTICULAR PARAMETER |
| 4 | PRIORITIZE ONE WITH GREATER WEIGHT OF EACH PARAMETER |
| 5 | PRIORITIZE PARAMETER OF SHORTER SCENE |
| ... | ... |
| 11 | PRIORITIZE GREATER AMPLITUDE IN LOWER BAND |
| 12 | PRIORITIZE SCENE WITH GREATER TEMPORAL VARIATION OF SOUND AND/OR VIDEO |
| 13 | PRIORITIZE SCENE WITH TARGET THAT IS CLOSE TO CENTER OF FIELD OF VIEW |
| 14 | PRIORITIZE SCENE X OVER SCENE W |
| ... | ... |

FIG.8

| SCENE NAME | SOUND EMPHASIS PARAMETER ||||| VIBRATION PARAMETER ||||||
| | FOR SPEAKER 1 || FOR SPEAKER 2 || FOR VIBRATION DEVICE 1 ||| FOR VIBRATION DEVICE 2 |||
| | DELAY | BAND EMPHASIS / ATTENUATION | DELAY | BAND EMPHASIS / ATTENUATION | LPF | DELAY | AMPLIFICATION | LPF | DELAY | AMPLIFICATION |
|---|---|---|---|---|---|---|---|---|---|---|
| EXPLOSION SCENE | 10 ms | LOWER BAND +15 db | 20 ms | LOWER BAND +5 db | 200 Hz | 10 ms | +15 dB | 200 Hz | 20 ms | +5 dB |
| CONCERT HALL SCENE | 50 ms | WHOLE BAND +10 db | 60 ms | WHOLE BAND +0 db | 200 Hz | 50 ms | +5 dB | 200 Hz | 60 ms | +0 dB |
| ⋮ | ⋮ | ⋮ | ⋮ | ⋮ | ⋮ | ⋮ | ⋮ | ⋮ | ⋮ | ⋮ |
| ELEPHANT WALKING SCENE | 10 ms | LOWER BAND +5 db | 20 ms | LOWER BAND +5 db | 50 Hz | 10 ms | +1.5 db | 50 Hz | 20 ms | +1.5 db |
| HORSE WALKING SCENE | 10 ms | LOWER BAND +10 db | 20 ms | LOWER BAND +10 db | 75 Hz | 10 ms | +1.0 db | 75 Hz | 20 ms | +1.0 db |
| VEHICLE RUNNING SCENE | 15 ms | WHOLE BAND +10 db | 25 ms | WHOLE BAND +10 db | 150 Hz | 15 ms | +0 db | 150 Hz | 25 ms | +0 db |
| VEHICLE SUDDEN-TURNING SCENE | 15 ms | WHOLE BAND +10 db | 25 ms | WHOLE BAND +10 db | 200 Hz | 15 ms | +1.5 db | 200 Hz | 25 ms | +1.0 db |
| ⋮ | ⋮ | ⋮ | ⋮ | ⋮ | ⋮ | ⋮ | ⋮ | ⋮ | ⋮ | ⋮ |

INFORMATION PROCESSING APPARATUS, SYSTEM, AND METHOD THAT EXTRACTS A VIBRATION PARAMETER FOR VIBRATION CONTROL BASED ON A SCENE OF INPUT CONTENT

CROSS-REFERENCE TO RELATED APPLICATION(S)

The present application claims the benefit of priority to Japanese Patent Application No. 2021-161742 filed on Sep. 30, 2021, Japanese Patent Application No. 2021-161743 filed on September 30, Japanese Patent Application No. 2021-161744 filed on Sep. 30, 2021, and Japanese Patent Application No. 2022-018701 filed on Feb. 9, 2022, the entire contents of all of which are incorporated by reference in the present application.

FIELD

A disclosed embodiment(s) relate(s) to an information processing apparatus, an information processing system, and an information processing method.

BACKGROUND

A technique to provide a digital content that includes virtual space experience such as Virtual Reality (VR), Augmented Reality (AR), and/or Mixed Reality (MR), or a so-called Cross Reality (XR) content to a user by using a Head Mounted Display (HMD) and/or the like has conventionally been known. XR is a representation that collects all virtual space techniques that include Substitutional Reality (SR), Audio/Visual (AV), and the like, as well as VR, AR, and MR.

Furthermore, for example, a technique to provide a user with a vibration that depends on a video that is viewed by a user, so as to attain improvement of a realistic sensation for such a video has been proposed (see, for example, Japanese Patent Application Publication No. 2004-081357)

However, in a conventional technique, a realistic sensation parameter for a realistic sensation has to be preliminarily set by manpower, so that manpower work with enormous man-hours is needed for setting of such a realistic sensation parameter.

SUMMARY

An information processing apparatus according to an aspect of an embodiment includes a control unit configured to execute a scene detection process that detects a scene from an input content, a parameter extraction process that extracts a realistic sensation parameter for wave control that corresponds to a scene that is detected by the scene detection process, and an output process that outputs a wave signal for the content that is produced by processing sound data of the input content by a realistic sensation parameter that is extracted by the parameter extraction process.

BRIEF DESCRIPTION OF DRAWING(S)

Figure 2:
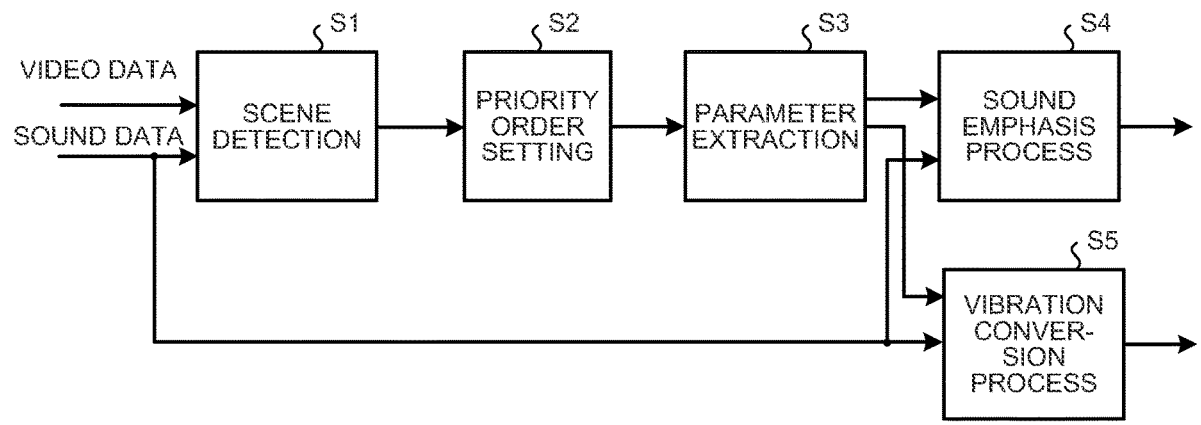
Figure 3:
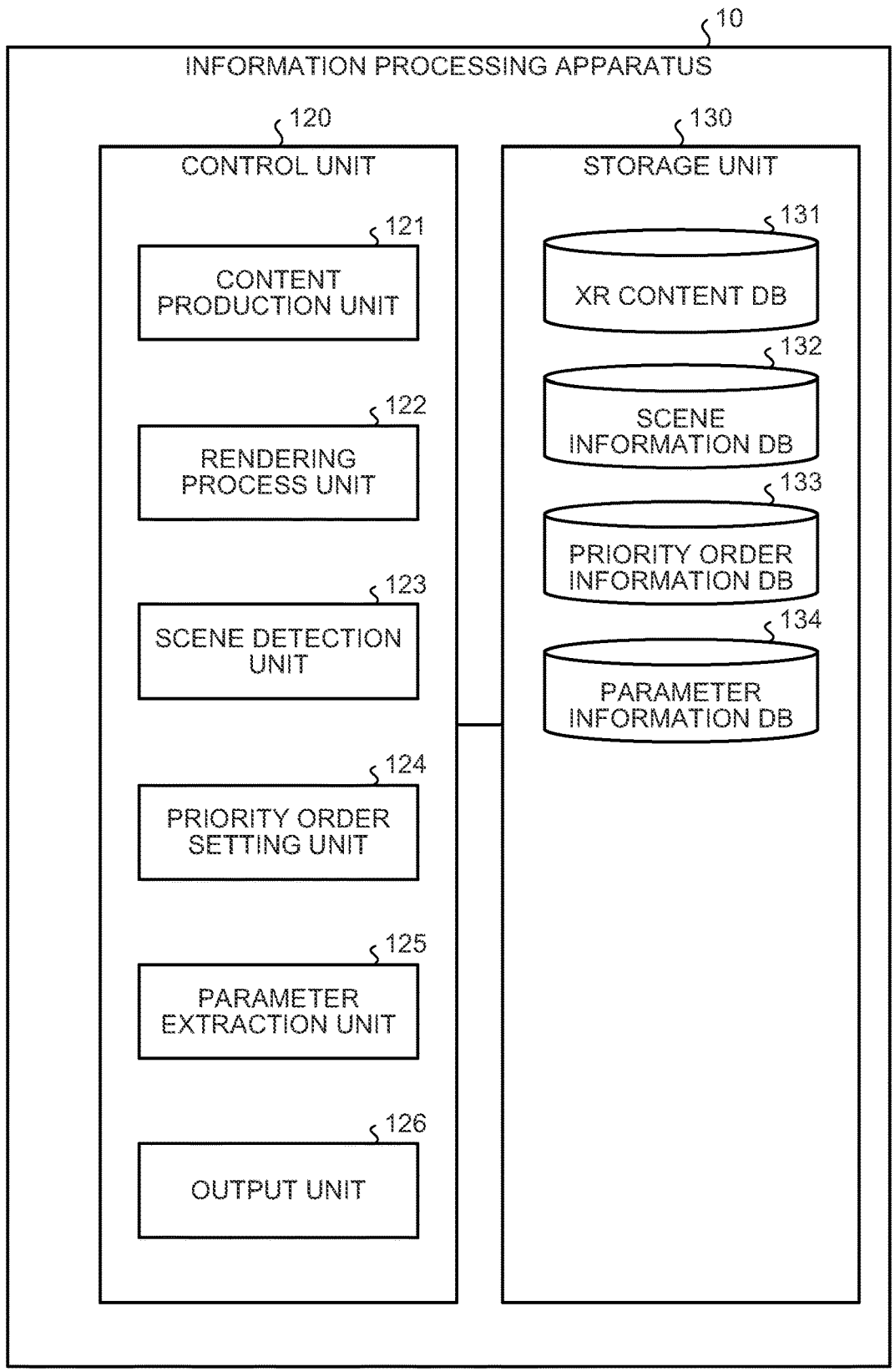
Figure 9:
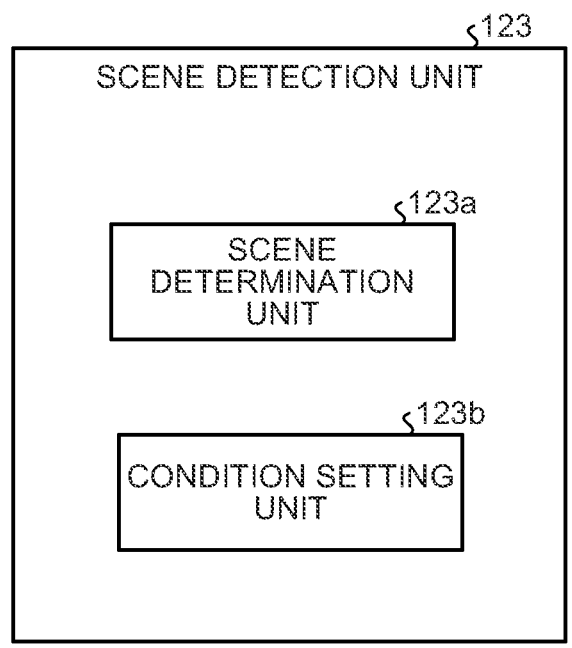
Figure 10:
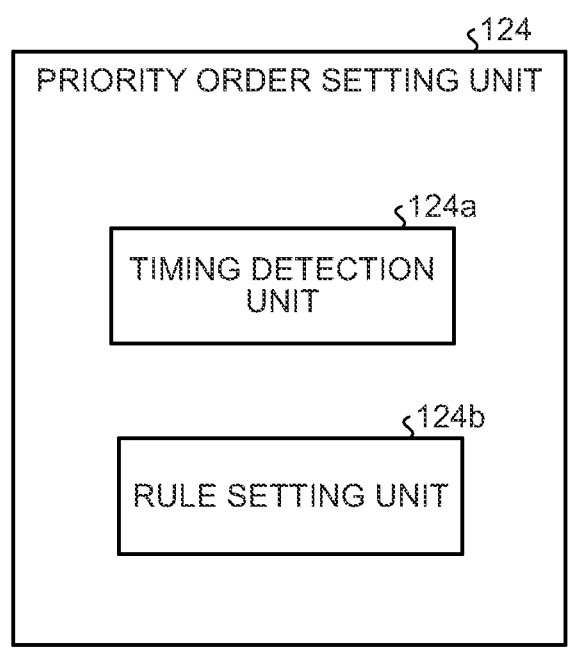
Figure 11:
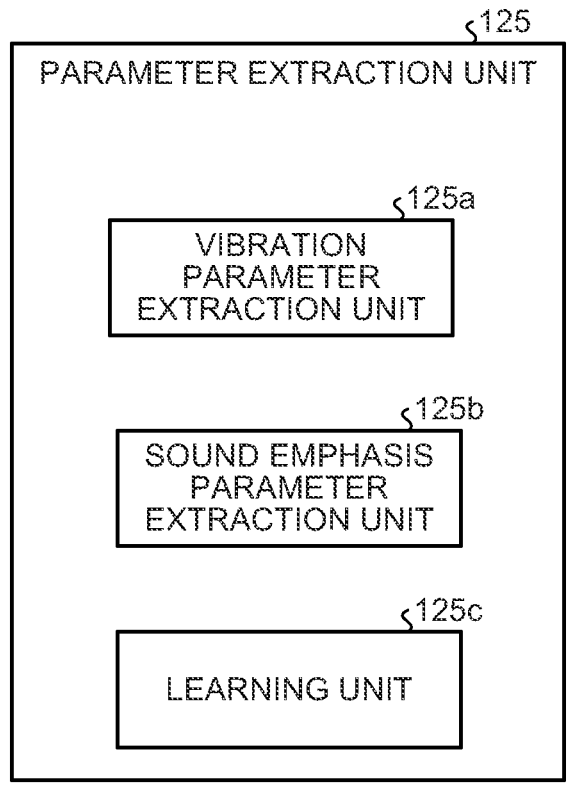
Figure 12:
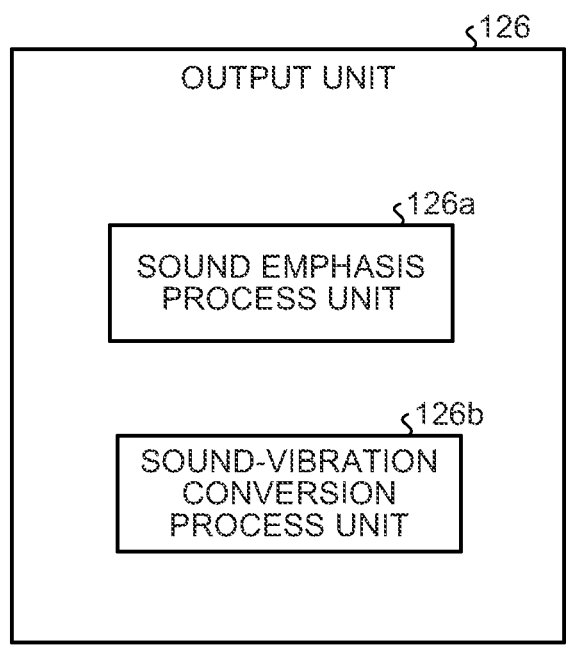
Figure 13:
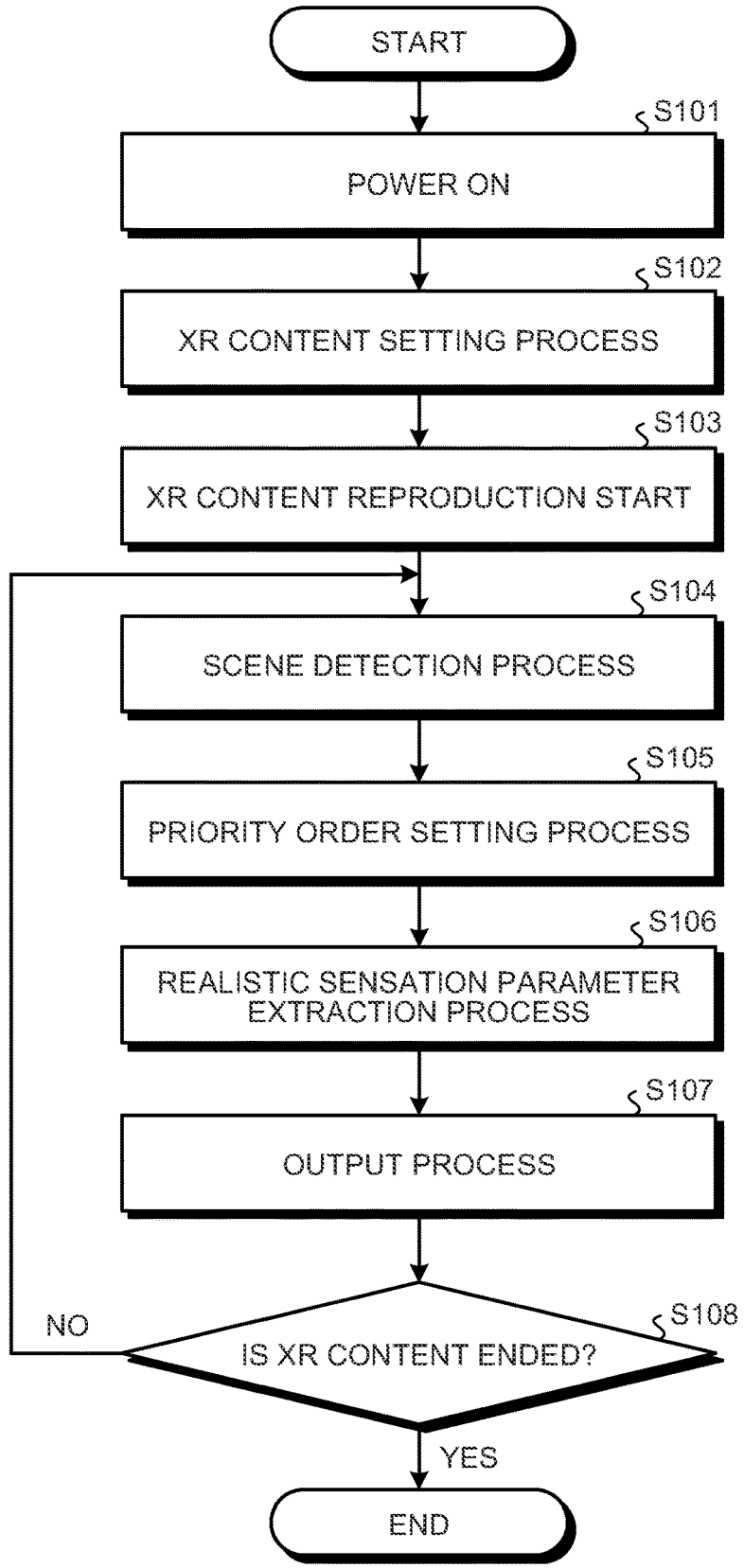
Figure 14:
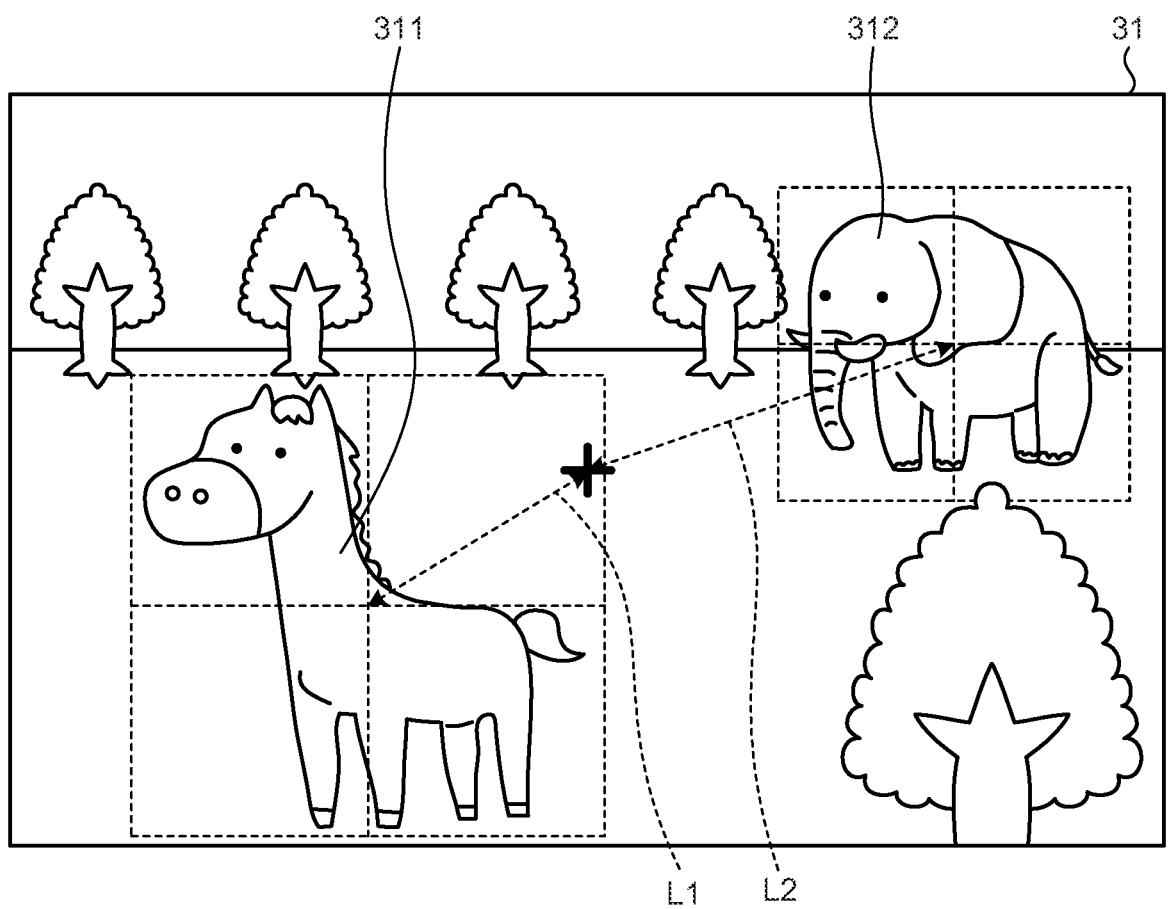

FIG. 1 is a diagram that illustrates an outline of an information processing system.
FIG. 2 is a diagram that illustrates an outline of an information processing method.
FIG. 3 is a block diagram of an information processing apparatus.
FIG. 4 is a diagram that illustrates an example of a scene information DB.
FIG. 5 is a diagram that illustrates an example of a scene information DB.
FIG. 6 is a diagram that illustrates an example of a scene information DB.
FIG. 7 is a diagram that illustrates an example of a priority order information DB.
FIG. 8 is a diagram that illustrates an example of a parameter information DB.
FIG. 9 is a block diagram of a scene detection unit.
FIG. 10 is a block diagram of a priority order setting unit.
FIG. 11 is a block diagram of a parameter extraction unit.
FIG. 12 is a block diagram of an output unit.
FIG. 13 is a flowchart that illustrates a process procedure that is executed by an information processing apparatus.
FIG. 14 is a diagram that illustrates an example of a determination method for a target that is prioritized.

DESCRIPTION OF EMBODIMENT(S)

Hereinafter, an embodiment(s) of an information processing apparatus, an information processing system, and an information processing method as disclosed in the present application will be explained in detail with reference to the accompanying drawing(s). Additionally, the present invention is not limited by an embodiment(s) as illustrated below.

First, an outline of an information processing system and an information processing method according to an embodiment will be explained by using FIG. 1 and FIG. 2. FIG. 1 is a diagram that illustrates an outline of an information processing system. FIG. 2 is a diagram that illustrates an outline of an information processing method. Additionally, a case where an XR space (a virtual space) is a VR space will be explained below.

As illustrated in FIG. 1, an information processing system 1 includes a display apparatus 3, a speaker 4, and a vibration device 5.

The display apparatus 3 is, for example, a head-mounted display and is an information processing terminal for presenting video data for an XR content that is provided from an information processing apparatus 10 to a user so as to cause such a user to enjoy VR experience.

Additionally, the display apparatus 3 may be a non-transmission type that completely covers a field of view or may be a video transmission type and/or an optical transmission type. Furthermore, the display apparatus 3 has a device that detects a change(s) of a situation(s) inside and/or outside a user by a sensor part, for example, a camera, a motion sensor, and/or the like.

The speaker 4 is a sound output device that outputs a sound and is, for example, provided on a headphone type and worn on an ear(s) of a user. The speaker 4 generates sound data that are provided from the information processing apparatus 10 as a sound. Additionally, the speaker 4 is not limited to a headphone type but may be a box type (that is installed on a floor and/or the like). Furthermore, the speaker 4 may be a stereo audio or multi-channel audio type.

The vibration device 5 is composed of an electricity-vibration converter that is composed of an electric and magnetic circuit and/or a piezoelectric element, is provided on, for example, a seat where a user is seated thereon, and vibrates according to vibration data that are provided from the information processing apparatus 10. Additionally, for example, a plurality of vibration devices 5 are provided on a seat and the information processing apparatus 10 separately controls each vibration device 5.

Such a sound that is provided by the speaker 4 and/or a vibration of the vibration device 5, that is, a wave that is provided by a wave device, is/are adapted to a reproduction video and is/are applied to a content user, so that it is possible to further increase a realistic sensation for video reproduction.

The information processing apparatus 10 is composed of a computer, is connected to the display apparatus 3 in a wired or wireless manner, and provides a video of an XR content to the display apparatus 3. Furthermore, for example, the information processing apparatus 10 acquires, as needed, a change of a situation that is detected by a sensor part that is provided on the display apparatus 3, and reflects such a change of a situation on an XR content.

For example, it is possible for the information processing apparatus 10 to change a direction of a field of view in a virtual space of an XR content, depending on a change of a head and/or a line of sight of a user that is detected by a sensor part.

Meanwhile, as an XR content is provided, a sound that is generated from the speaker 4 is emphasized according to a scene or the vibration device 5 is vibrated according to a scene, so that it is possible to attain improvement of a realistic sensation of an XR content.

However, a parameter that is used for realistic sensation control for attaining such improvement of a realistic sensation (that will be a realistic sensation parameter, below) has to be set by manpower after production of an XR content, so that an enormous amount of work is needed for setting of a realistic sensation parameter.

Hence, in an information processing method, automation of setting of such a realistic sensation parameter is attained. For example, as illustrated in FIG. 2, in an information processing method according to an embodiment, first, a scene that satisfies a predetermined condition is detected from video data and sound data for an XR content (step S1).

A predetermined condition herein is, for example, a condition on whether or not corresponding video data or sound data are a scene where setting of a realistic sensation parameter is needed, and is defined by, for example, a conditional expression for a situation of an inside of an XR content.

That is, in an information processing method, in a case where a situation of an inside of an XR content satisfies a condition that is defined by a conditional expression, detection is executed as a scene that satisfies a predetermined condition. Thereby, in an information processing method, a process that analyzes video data in detail and/or the like is/are not needed, so that it is possible to attain reduction of a processing load of scene detection.

Then, in an information processing method, a priority order is set for a scene that is detected by scene detection (step S2). Herein, a priority order represents an order for a scene with a realistic sensation parameter that should be prioritized. That is, in an information processing method, in a case where a plurality of scenes overlap temporally, a scene with a realistic sensation parameter that should be prioritized is preliminarily defined for each scene.

Thereby, even in a case where a plurality of scenes overlap, it is possible to provide a suitable realistic sensation to a user. Additionally, as described later, in an information processing method, each of a priority order for a sound and a priority order for a vibration is set separately.

Then, in an information processing method, a realistic sensation parameter is extracted for each scene (step S3). For example, in an information processing method, a realistic sensation parameter is extracted for each scene by using parameter information where a relationship between a scene and a realistic sensation parameter is preliminarily defined.

Herein, in an information processing method, a corresponding realistic sensation parameter is extracted depending on a priority order. Specifically, in an information processing method, for example, in a case where a scene with a low priority order and a scene with a high priority order overlap, a realistic sensation parameter of such a scene with a high priority order is extracted.

In an information processing method, a sound emphasis process that emphasizes sound data is executed by using a sound emphasis parameter among extracted realistic sensation parameters (step S4), and an output thereof to the speaker 4 is executed. Furthermore, in an information processing method, after a vibration conversion process that converts sound data into vibration data is executed and such vibration data are emphasized by using a vibration parameter among extracted realistic sensation parameters (step S5), an output thereof to the vibration device 5 is executed.

Thereby, in an information processing method, it is possible to provide a sound that is emphasized according to a scene that is viewed by a user and/or a vibration that is dependent on a scene to a user.

Thus, in an information processing method according to an embodiment, after a scene is detected from an XR content and a priority order is set, a realistic sensation parameter for wave control that includes a sound process and a vibration process for a scene is extracted. Therefore, in an information processing method according to an embodiment, it is possible to automate setting of a realistic sensation parameter for improvement of a realistic sensation of a content.

Next, a configuration example of an information processing apparatus 10 according to an embodiment will be explained by using FIG. 3. FIG. 3 is a block diagram of the information processing apparatus 10. As illustrated in FIG. 3, the information processing apparatus 10 includes a control unit 120 and a storage unit 130.

The storage unit 130 is realized by, for example, a semiconductor memory element such as a Random Access memory (RAM) and/or a flash memory (Flash Memory) or a storage apparatus such as a hard disk and/or an optical disk. In an example of FIG. 3, the storage unit 130 has an XR content Database (DB) 131, a scene information DB 132, a priority order information DB 133, and a parameter information DB 134.

The XR content DB 131 is a database where an XR content group that is displayed on a display apparatus 3 is stored therein. The scene information DB 132 is a database that stores a variety of information for a scene that is detected.

FIG. 4 to FIG. 6 are diagrams that illustrate an example of the scene information DB 132. As illustrated in FIG. 4, for example, the scene information DB 132 stores information for items of "DETECTION SCENE", "CONDITION CATEGORY", "TARGET", "CONDITION PARAMETER", "THRESHOLD", and "CONDITIONAL EXPRESSION" so as to correspond to one another.

"DETECTION SCENE" represents a name of scene that is detected. Additionally, "DETECTION SCENE" functions as an identification symbol where, although a code such as a numerical value is usually utilized, a name (with prohibition of duplication thereof) is used for the sake of clarity of explanation in the present example. "CONDITION CATEGORY" represents a category of information where a scene is detected based thereon. In an example as illustrated in the same figure, broad classification into categories such as a positional relationship between a user and a target, movement of a user, information of a space where a user is presented, and information of a time when a user is present is executed. Additionally, a user herein represents an operator himself/herself in an XR space.

"TARGET" represents a target for scene detection. In an example as illustrated in the same figure, information such as object 1, object 2, a user, space 1, space 1+object 3, and/or content 1 corresponds to a target. Herein, object 1, object 2, and object 3 represent respectively different objects in an XR space. Furthermore, space 1 represents, for example, a space in an XR space where a user is present, and content 1 represents, for example, a predetermined event in an XR space.

"CONDITION PARAMETER" represents a condition for a parameter such as a parameter that is used as scene detection is executed. As illustrated in the same figure, for example, information such as a distance, an angle, a velocity, an acceleration, a rotational velocity, an inside of a space, presence and/or a quantity of an object, and/or a starting time to an ending time corresponds thereto.

"THRESHOLD" represents a threshold that corresponds to a condition parameter. Furthermore, "CONDITIONAL EXPRESSION" represents a conditional expression for detecting a detection scene, and for example, a relationship between a condition parameter and a threshold is defined as a conditional expression.

Furthermore, in the information processing apparatus 10, a scene may be detected by, for example, combining condition categories or condition parameters as illustrated in FIG. 4. For example, as illustrated in FIG. 5, a detection scene may be set by combining condition categories of a plurality of scenes, and further, as illustrated in FIG. 6, a detection scene may be set by combining condition parameters of a plurality of scenes.

For example, condition categories and/or condition parameters are thus combined, so that it is possible to simplify setting of a new detection scene.

By returning to an explanation for FIG. 3, the priority order information DB 133 will be explained. For example, in the information processing apparatus 10 according to an embodiment, a priority order for each scene is set on a rule basis. The priority order information DB 133 stores a variety of information for a priority order of a realistic sensation parameter. FIG. 7 is a diagram that illustrates an example of the priority order information DB 133.

As illustrated in FIG. 7, for example, the priority order information DB 133 stores information for items of "RULE NUMBER" and "PRIORITY ORDER RULE" so as to correspond to one another. "RULE NUMBER" represents a number for identifying a priority order rule and "PRIORITY ORDER RULE" represents a rule for a priority order.

"PRIORITIZE SCENE THAT IS DETECTED PREVIOUSLY" and "PRIORITIZE SCENE THAT IS DETECTED SUBSEQUENTLY (SWITCH WHEN SUBSEQUENT SCENE IS PROVIDED)" as illustrated in the same figure represent to prioritize a realistic sensation parameter of a scene that is provided temporally previously or subsequently, respectively. Thereby, for example, it is possible to simplify a rule at a time of setting of a degree of priority of a scene.

Furthermore, "PRIORITIZE ONE WITH GREATER WEIGHT OF PARTICULAR PARAMETER" represents to prioritize a realistic sensation parameter of a scene with a sound emphasis parameter or a vibration parameter that is greater, among realistic sensation parameters.

That is, in such a case, a realistic sensation parameter that is extracted for a scene with a sound emphasis parameter or a vibration parameter that is greater is set, so that it is possible to provide a realistic sensation parameter that is associated with sound data or vibration data that should be emphasized.

Furthermore, "PRIORITIZE ONE WITH GREATER WEIGHT OF EACH PARAMETER" represents to prioritize each of realistic sensation parameters of scenes with a sound emphasis parameter and a vibration parameter that are greater, among realistic sensation parameters. In a case of such a rule, parameters of mutually different scenes may be used for a sound emphasis parameter and a vibration parameter.

That is, in such a case, it is possible to emphasize each of vibration data and sound data by a realistic sensation parameter with a greater value, so that it is possible to improve a realistic sensation of each of such vibration data and sound data. Additionally, a greater or less weight herein represents, for example, a greater or less value of a parameter.

Furthermore, "PRIORITIZE PARAMETER OF SHORTER SCENE" represents to prioritize a realistic sensation parameter of a scene with a shorter length of time. In a case where a scene with a shorter period of time interrupts a scene with a longer period of time at a time of reproduction thereof, a realistic sensation parameter of a scene with a shorter period of time is preferentially set during such a scene.

Thereby, for example, it is possible to emphasize a scene with a shorter period of time suitably. Additionally, a rule may be set so as to prioritize a parameter of a longer scene.

By returning to an explanation for FIG. 3, the parameter information DB 134 will be explained. The parameter information DB 134 is a database that stores information for a realistic sensation parameter for each scene. FIG. 8 is a diagram that illustrates an example of the parameter information DB 134.

As illustrated in FIG. 8, for example, the parameter information DB 134 stores information for items of "SCENE NAME", "SOUND EMPHASIS PARAMETER", and "VIBRATION PARAMETER" so as to correspond to one another.

"SCENE NAME" represents a name of a detection scene as described above and corresponds to, for example, a "DETECTION SCENE" as illustrated in FIG. 4 and the like. Additionally, "SCENE NAME" is herein illustrated as an explosion scene and/or a concert hall scene from the viewpoint of clarity of an explanation.

"SOUND EMPHASIS PARAMETER" represents a sound emphasis parameter that is set in a corresponding scene. For example, as illustrated in FIG. 8, a sound emphasis parameter stores a separate parameter for each of respective speakers 4, depending on a number of the speakers 4, such as "FOR SPEAKER 1", "FOR SPEAKER 2", and the like.

Furthermore, for example, a value of a parameter in an item for a sound process such as "DELAY" or "BAND EMPHASIS/ATTENUATION" is stored for each speaker 4. For example, "DELAY" represents a parameter for a delay time and "BAND EMPHASIS/ATTENUATION" represents a parameter such as a band where a sound is emphasized or attenuated therein and a degree thereof.

"VIBRATION PARAMETER" represents a sound emphasis parameter that is set in a corresponding scene, and stores a separate parameter for each of respective vibration devices 5 depending on a number of the vibration devices 5 similarly to "SOUND EMPHASIS PARAMETER". For example, a parameter in each of items of "LPF (Low Pass Filter)", "DELAY", and "AMPLIFICATION" is stored as "VIBRATION PARAMETER".

"LPF" represents a parameter for a low-pass filter and "DELAY" represents a parameter for a delay time. Furthermore, "AMPLIFICATION" represents a parameter for a vibration process such as a degree of amplification or attenuation that is executed.

By returning to an explanation for FIG. 3, the control unit 120 will be explained. The control unit 120 is a controller (a controller) and is realized by, for example, a Central Processing Unit (CPU), a Micro Processing Unit (MPU), and/or the like where a variety of programs that are stored in the storage unit 130 where illustration thereof is omitted are executed in a RAM as a workspace. Furthermore, it is also possible to realize the control unit 120 by, for example, an integrated circuit such as an Application Specific Integrated Circuit (ASIC) and/or a Field Programmable Gate Array (FPGA).

The control unit 120 has a content production unit 121, a rendering process unit 122, a scene detection unit 123, a priority order setting unit 124, a parameter extraction unit 125, and an output unit 126, and realizes or executes a function and/or an action of information processing that will be explained below.

The content production unit 121 produces a 3D model for a space in an XR content. For example, the content production unit 121 refers to the XR content DB 131 and produces a 3D model of a space in an XR content according to a current field of view of a user in such an XR content. The content production unit 121 passes a produced 3D model to the rendering process unit 122.

The rendering process unit 122 executes a rendering process that converts a 3D model that is received from the content production unit 121 into video data and/or sound data. For example, the rendering process unit 122 outputs converted video data to a display apparatus (see FIG. 1) and passes them to the scene detection unit 123. Furthermore, the rendering process unit 122 passes converted sound data to the output unit 126 and the scene detection unit 123. Additionally, the content production unit 121 and the rendering process unit 122 have a function as a calculation unit that calculates condition data for an item of a conditional expression from a content.

The scene detection unit 123 detects a scene that satisfies a predetermined condition from an input content. For example, the scene detection unit 123 detects a scene where a realistic sensation parameter should be set, by using video data that are input from the rendering process unit 122 and a conditional expression that is stored in the scene information DB 132.

Herein, for example, the scene detection unit 123 receives, for example, coordinate information of an object in an XR space and information for an object type from the rendering process unit 122, and detects a scene where a realistic sensation parameter should be set, by using a conditional expression.

Additionally, for example, in a case where an XR content is an MR content, the scene detection unit 123 may execute, for example, image analysis for an image that is provided by capturing an inside of an MR space so as to execute recognition of an object in such an MR space or calculation of coordinates of such an object.

FIG. 9 is a block diagram of the scene detection unit 123. As illustrated in FIG. 9, for example, the scene detection unit 123 includes a scene determination unit 123a and a condition setting unit 123b. The scene determination unit 123a determines whether or not a situation in video data satisfies a detection condition for each scene, by using each of condition data (a conditional expression) for scene determination that is stored in the scene information DB 132.

More specifically, for example, as illustrated in FIG. 4, the scene determination unit 123a determines whether or not a current situation in an XR space corresponds to each detection scene that is preliminarily defined, based on a positional relationship between a user and a target (an object in an XR space), movement of a user, and/or data for an item of a conditional expression such as information of a space where a user is present (that are calculated from a content by the content production unit 121 or the rendering process unit 122).

Herein, the scene determination unit 123a executes a scene detection process by using text information data that is already calculated by the content production unit 121 or the rendering process unit 122, such as movement of a user in an XR space, coordinate information of an object and information for an object type, space information, and/or the like.

Thereby, for example, even in a case where a performance of a CPU is comparatively low, it is possible to execute processes such as scene detection to realistic sensation parameter extraction processes, in parallel to a process with a comparatively heavy processing load such as a rendering process that is executed by the rendering process unit 122.

Furthermore, herein, for example, the scene determination unit 123a may determine whether or not a current situation in an XR space corresponds to each detection scene, based on, for example, a combination of condition categories as illustrated in FIG. 5 or information for scene determination that also includes a combination of condition parameters as illustrated in FIG. 6.

Then, in a case where the scene determination unit 123a determines that it corresponds to a detection scene, detection scene information for such video data is passed to a priority order setting unit 124 (see FIG. 3). Additionally, in a case where the scene determination unit 123a determines that it does not correspond to any detection scene, it is not a corresponding detection scene and a realistic sensation parameter is returned to an initial state thereof (a realistic sensation parameter in a case where it is not a corresponding detection scene). Furthermore, in a case where the scene determination unit 123a determines that a current situation of an XR space corresponds to a plurality of detection scenes, a plurality of determined detection scenes are passed to the priority order setting unit 124.

Furthermore, although a case where the scene determination unit 123a determines whether or not it is a detection scene, based on video data, has been explained herein, the scene determination unit 123a may determine whether or not it is a detection scene based on sound data.

The condition setting unit 123b sets a variety of conditional expressions for scene detection. The condition setting unit 123b sets a conditional expression based on, for example, information that is input from a producer of an XR content and/or a user.

For example, the condition setting unit 123b receives an input of information such as a realistic sensation parameter and a scene where it is set, from a producer or a user, and puts a situation of such a scene into a conditional expression. Then, the condition setting unit 123b writes information for a conditional expression in the scene information DB 132 for each setting of a conditional expression and writes a corresponding realistic sensation parameter in the parameter information DB 134.

Thereby, in the information processing apparatus 10, it is possible to detect a scene that is requested by a producer or a user and it is possible to set a realistic sensation parameter that is requested by such a producer or a user for a detected scene.

By returning to an explanation for FIG. 3, the priority order setting unit 124 will be explained. The priority order setting unit 124 sets a priority order for a scene that is detected by the scene detection unit 123.

For example, the priority order setting unit 124 refers to the priority order information DB 133 and selects a scene where a process is prioritized in a case where the scene detection unit 123 determines that a plurality of types of scenes are detected simultaneously. Additionally, in a case where the scene detection unit 123 determines that only one scene is detected, such a scene is a top of a priority order.

FIG. 10 is a block diagram of the priority order setting unit 124. For example, as illustrated in FIG. 10, the priority order setting unit 124 has a timing detection unit 124a and a rule setting unit 124b.

The timing detection unit 124a detects a timing when a scene that is detected by the scene detection unit 123 is generated and a timing of ending thereof. For example, the timing detection unit 124a detects each scene that is present at each point of time (and also detects an overlap state), a timing of generation of a scene that is present, a timing when a scene that is present is deleted, and/or the like, based on scene information at each point of time from the scene detection unit 123. That is, the timing detection unit 124a detects states of all scenes that are present at each point of time that include orders of generation thereof.

The rule setting unit 124b sets a priority order of a scene that is used for determination of a realistic sensation parameter, for a scene that is detected by the scene detection unit 123. That is, a scene with a parameter that is linked thereto and is preferentially used is determined as a realistic sensation parameter that is used at a point of time thereof, based on states of all scenes that are present and are detected by the timing detection unit 124a, so that a priority order is set for a detection scene. Thereby, in the information processing apparatus 10, it is possible to set a realistic sensation parameter that is dependent on such a priority order.

That is, in the information processing apparatus 10, a priority order condition is preliminarily set for each scene, so that, in a case where scene A and scene B overlap temporally, it is possible to suitably determine a scene with a realistic sensation parameter that should be used preferentially.

For example, the rule setting unit 124b refers to the priority order information DB 133 and sets a priority order of a scene where a parameter that is used is determined is set for each of a sound emphasis parameter and a vibration parameter. Herein, the rule setting unit 124b may set a scene that is used for parameter selection, based on, for example, a priority order rule that is independent for each speaker 4 and/or each vibration device 5.

Thereby, in each speaker 4 and each vibration device 5, a realistic sensation parameter is set according to an individual rule, so that it is possible to attain further improvement of a realistic sensation as compared with a case where a realistic sensation parameter is set uniformly.

Furthermore, the rule setting unit 124b passes information for a set rule to a parameter extraction unit 125 (see FIG. 3) so as to correspond to video data and sound data.

By returning to an explanation for FIG. 3, the parameter extraction unit 125 will be explained. The parameter extraction unit 125 extracts a realistic sensation parameter for a scene that is detected by the scene detection unit 123.

FIG. 11 is a block diagram of the parameter extraction unit 125. As illustrated in FIG. 11, the parameter extraction unit 125 has a vibration parameter extraction unit 125a, a sound emphasis parameter extraction unit 125b, and a learning unit 125c.

The vibration parameter extraction unit 125a refers to the parameter information DB 134 and extracts a vibration parameter that corresponds to a scene that is provided with a top priority order by the priority order setting unit 124. For example, the vibration parameter extraction unit 125a extracts, from the parameter information DB 134, a vibration parameter that corresponds to a "detection scene" with a top priority order that is received from the priority order setting unit 124, so as to extract a vibration parameter that corresponds to a scene.

That is, in a case where the scene detection unit 123 detects a plurality of temporally overlapping scenes where targets that generate sounds thereof are different from one another, it is possible for the parameter extraction unit 125 to select a scene with a high priority, that is, one that is estimated in such a manner that a user feels a more realistic sensation by a vibration, and extract a parameter for vibration production that corresponds to such a scene. As a result, it is possible to produce a vibration for a rich realistic sensation by a suitable parameter, even during a period of time for reproduction of a content where a plurality of scenes overlap.

Specifically, it is possible for the scene detection unit 123 to realize executing of such a scene selection process, by setting contents of a rule for a priority order in a priority order information DB as illustrated in FIG. 7 and a priority order condition for each scene (that is set and stored in a scene information DB as illustrated in FIG. 4).

For example, in a case where the scene detection unit 123 detects a scene where an elephant generates a walking sound thereof (an elephant walking scene) and a scene where a horse generates a walking sound thereof (a horse walking scene), the parameter extraction unit 125 prioritizes such an elephant walking scene according to a rule of "to prioritize a greater amplitude in a lower band". Thereby, a vibration that reproduces a vibration that is caused by walking of an elephant and that is a vibration that is also mainly felt in a real world is also applied to a user in content reproduction (for example, a virtual space), so that it is possible for such a user to obtain a vibratory sensation with a rich realistic sensation, that is, one that is close to reality.

Furthermore, in a case where the scene detection unit 123 detects a plurality of temporally overlapping scenes where targets that generate sounds thereof are different from one another, it is also possible for the parameter extraction unit 125 to apply thereto a method that extracts a parameter that corresponds to a selected scene among such a plurality of scenes, based on a type and a position of a target that corresponds to each of the plurality of scenes, in an image that is included in a content.

Specifically, setting contents of a rule for a priority order in a priority order information DB as illustrated in FIG. 7 and a priority order condition for each scene (that is set and stored in a scene information DB as illustrated in FIG. 4) are set (in a case of the present example, a function value F (M, d) of a type (m) of a target and a distance (d) to such a target is added to such a priority order condition and a condition that is provided by a function value F (M, d) (for example, a greater function value "F (M, d)" is prioritized) is added to a rule for a priority order), so that it is possible for the scene detection unit 123 to realize executing of such a scene selection process.

A method that determines a scene that is prioritized based on a position of a target will be explained by using a specific example as illustrated in FIG. 14. FIG. 14 is a diagram that illustrates an example of a determination method for a target that is prioritized.

As illustrated in FIG. 14, the display apparatus 3 displays an image 31 of a content during reproduction thereof. An object 311 (a horse) and an object 312 (an elephant) are seen in the image 31. Herein, the scene detection unit 123 detects both a horse walking scene and an elephant walking scene that satisfy a condition as a target scene for vibration control.

Furthermore, a distance L1 from a reference position (a position of a user in a content image, for example, a position of an avatar that corresponds to a user in an XR content) to the object 311 is provided. On the other hand, a distance L2 from such a reference position to the object 312 is provided. Furthermore, reference vibration intensities V1, V2 of the object 311 and the object 312 (intensities of lower frequency components of sound signals of objects in a content) are provided respectively. Moreover, a case where a priority condition of "to prioritize a greater value of a function F(Ln, Vn)=Vn/(Ln·Ln)" is set is provided as an example.

Additionally, a distance from a reference position to an object is calculated from information that is added to a content and/or the like (for example, it is calculated from positional information of each object that is used for video production in an XR content). Furthermore, it is possible to realize a reference vibration intensity of an object by a method that executes determination thereof by reading thereof from a data table where a preliminarily set reference vibration intensity is stored for each object type, depending on a type of a target object, a method that executes addition thereof to a content as content information, and/or the like. Furthermore, sound data for sound reproduction are frequently added to a content, so that it is possible to calculate a reference vibration intensity based on a lower band characteristic (a sound intensity level, a lower band signal level, and/or the like) of such sound data (a vibration mode is highly correlated with a lower band component of a sound and further a vibration is frequently produced based on such a lower band component of a sound).

Thus, it is possible for the information processing apparatus 10 to estimate a lower band characteristic of a sound that is generated by a vibration generation target in a content. In such a case, the information processing apparatus 10 selects a vibration generation target based on an estimated lower band characteristic. Thereby, selection of a more suitable vibration generation target is possible.

For example, a lower band characteristic of a sound is a lower band signal level. In such a case, the information processing apparatus 10 selects a vibration generation target where an estimated lower band signal level is greater than a threshold. It is possible for the information processing apparatus 10 to extract a lower band signal level from sound data. Thereby, it is possible to readily select a vibration generation target by using a lower band signal level that is included in sound data.

Furthermore, a threshold for a lower band signal level is set depending on a content type. As described previously, it is frequently preferable to generate a vibration, even for an identical target, in a music video, as compared with an animal documentary. Thus, selection of a vibration target that is suitable for a content type (a music video, an animal documentary, and/or the like) is possible.

In such a case, if a relationship between function values of the object 311 (a horse) and the object 312 (an elephant) is a function F (L1, V1)>a function F (L2, V2), a scene where the object 311 generates a sound (a vibration), that is, a horse walking scene, is selected preferentially, and the parameter extraction unit 125 extracts a vibration parameter that corresponds to such a horse walking scene. Then, a vibration that corresponds to a horse walking scene is applied to a user. Subsequently, for example, if the object 312 (an elephant) approaches a reference position and it is changed to a relationship of a function F (L1, V1)<a function F (L2, V2), a scene where the object 312 generates a sound (a vibration), that is, an elephant walking scene, is selected preferentially, and the parameter extraction unit 125 extracts a vibration parameter that corresponds to such an elephant walking scene. Then, a vibration that corresponds to an elephant walking scene is applied to a user.

Additionally, in a case where a function F (Ln, Vn) is less than a preliminarily determined or predetermined threshold, that is, a case where a vibration that is caused by a target at a user position in a content (a virtual space of a game and/or the like) is weak (such a user is provided with a less sensation, that is, a less vibration is needed to be applied thereto), a method is also effective that does not execute selection thereof as a target that generates a vibration. In other words, a method is also effective that selects, as a target that generates a vibration, only an object of a content where a vibration that is caused by a target at a user position in a content (a virtual space of a game and/or the like) is strong to some extent (to a degree that, if a vibration is reproduced, improvement of a realistic sensation is felt). That is, a target is selected that provides a significant influence on a vibration signal that is generated from a target candidate that is provided as a candidate for a vibration generation target (a vibration target where a user strongly feels a vibration thereof).

Thereby, it is possible for the information processing apparatus 10 to estimate a target candidate that provides a significant influence on a vibration signal that is generated from such a target candidate that is provided as a candidate for a vibration generation target and select it as such a vibration generation target. As a result, a vibration that matches a sensation of a user in a real space is applied to a user, so that reproduction of a content with a rich realistic sensation is possible.

In such a case, it is preferable to change a threshold in a case where it is selected as a target that generates a vibration, based on a content type. That is, it may be preferable to suspend or emphasize reproduction of a vibration that is caused by an object that appears in a content, depending on a substance of such a content, because it is preferable to adjust a determined content (a determination level) of a target that generates a vibration.

That is, a principle of production of a vibration is as follows. A target that generates a vibration in (each situation of) a content is determined based on a substance of a content. Then, a vibration signal (vibration data) is/are produced (it is produced by taking and appropriately amplifying a lower frequency component of a sound signal of a target, and/or the like) based on an audio signal that corresponds to a determined target (sound data of a target that is included in a content or sound data of a target that is produced from sound data in such a scene (that are taken by, for example, filtering a lower frequency domain)).

Furthermore, in a method that determines a target that generates a vibration, a lower band characteristic (for example, a sound volume level) of a vocalized sound of a sound generation object in a content is estimated (in a case of an example as described above, it is estimated based on a reference vibration intensity that is based on a type of an object and a distance between a reference position (a position where a user is present in a virtual space of a content and/or the like) and such an object) and a target is determined (a sound generation object with a greater lower band sound volume level of a vocalized sound thereof is determined as a target that generates a vibration).

Thus, a scene that is prioritized is determined based on a position of a target, so that a vibration that is further adapted to a visual intuition of a user, that is, a vibration that matches a sensation of a user in a real space is applied to a user and reproduction of a content with a rich realistic sensation is possible.

Herein, the vibration parameter extraction unit 125a extracts a vibration parameter that corresponds to each vibration device 5. Thereby, it is possible to attain further improvement of a realistic sensation as compared with a case where a vibration parameter is extracted uniformly.

The sound emphasis parameter extraction unit 125b refers to the parameter information DB 134 and extracts a sound emphasis parameter that corresponds to a scene that is provided with a top priority order by the priority order setting unit 124. The sound emphasis parameter extraction unit 125b separately extracts a sound emphasis parameter for each speaker 4, and determines a sound emphasis parameter that is extracted based on a priority order that is set by the priority order setting unit 124 (or based on a scene with a top priority order) similarly to the vibration parameter extraction unit 125a.

The learning unit 125c learns a relationship between a scene and a realistic sensation parameter that is stored in the parameter information DB 134. For example, the learning unit 125c executes machine learning for each scene that is stored in the parameter information DB 134 and each corresponding realistic sensation parameter while reaction of a user to realistic sensation control that is executed by such a parameter or the like is provided as learning data, so as to learn a relationship between a scene and a realistic sensation parameter.

Herein, for example, the learning unit 125c may use a user evaluation for a realistic sensation parameter (an adjustment operation of a user after realistic sensation control and/or a user input such as a questionnaire) as learning data. That is, the learning unit 125c may learn a relationship between a scene and a realistic sensation parameter from a viewpoint of a scene and a realistic sensation parameter that is set for it, so as to obtain a high user evaluation (that is, so as to obtain a high realistic sensation).

Moreover, it is also possible for the learning unit 125c to determine a realistic sensation parameter that should be set, from a result of learning, in a case where a new scene is input thereto. As a specific example, for example, it is possible to determine a realistic sensation parameter of a firework scene by using a result of learning of realistic sensation control for a similar situation such as an explosion scene. Furthermore, it is also possible to learn a rule for a priority order, based on presence or absence and/or a degree of an element that changes a priority order in an adjustment operation of a user after realistic sensation control and/or a user input such as a questionnaire (in a case where an adjustment operation of a user approaches a parameter that corresponds to another scene that is present simultaneously, a case where an answer that another scene should be prioritized is provided in a questionnaire, and/or the like).

Thereby, in the information processing apparatus 10, for example, it is possible to execute optimization of a rule for a priority order and/or a realistic sensation parameter automatically.

By returning to an explanation for FIG. 3, the output unit 126 will be explained. The output unit 126 outputs a realistic sensation parameter that is extracted by the parameter extraction unit 125 to the speaker 4 and the vibration device 5.

FIG. 12 is a block diagram of the output unit 126. As illustrated in FIG. 12, the output unit 126 has a sound emphasis process unit 126a and a sound-vibration conversion process unit 126b.

The sound emphasis process unit 126a executes an emphasis process that uses a sound emphasis parameter that is extracted by the parameter extraction unit 125, for sound data that are received from the rendering process unit 122. For example, the sound emphasis process unit 126a executes delay or a band emphasis/attenuation process based on a sound emphasis parameter, so as to execute an emphasis process for sound data.

Herein, the sound emphasis process unit 126a executes a sound emphasis process for each speaker 4 and outputs sound data where a sound emphasis process is applied thereto to each corresponding speaker 4.

The sound-vibration conversion process unit 126b executes a band limitation process and/or the like that is/are suitable for a vibration and is executed by an LPF and/or the like, for sound data that are received from the rendering process unit 122 so as to execute conversion thereof into vibration data. Furthermore, the sound-vibration conversion process unit 126b executes an emphasis process for a converted vibration parameter, depending on a vibration parameter that is extracted by the parameter extraction unit 125.

For example, the sound-vibration conversion process unit 126b executes, for vibration data, an emphasis process such as a frequency characteristic addition process such as lower band emphasis, delay, and amplification, depending on a vibration parameter, so as to execute such an emphasis process for such vibration data.

Herein, the sound-vibration conversion process unit 126b executes a vibration emphasis process for each vibration device 5 and outputs vibration data where such a vibration emphasis process is applied thereto to each corresponding vibration device 5.

Next, a process procedure that is executed by an information processing apparatus 10 according to an embodiment will be explained by using FIG. 13. FIG. 13 is a flowchart that illustrates a process procedure that is executed by the information processing apparatus 10. Additionally, a process procedure as illustrated below is repeatedly executed by a control unit 120.

A process of a flowchart as illustrated in FIG. 13 is executed as a power source of an information processing system 1 is turned on (step S101). Then, an XR content setting process is first executed (step S102). Additionally, an XR content setting process herein includes, for example, each initial setting of an apparatus for XR content reproduction, and a variety of processes for selection and/or the like of an XR content that is executed by a user.

Subsequently, the information processing apparatus 10 starts reproduction of an XR content (step S103) and executes a scene detection process for an XR content during reproduction thereof (step S104). Subsequently, the information processing apparatus 10 executes a priority order setting process for a result of a scene detection process (step S105) and executes a realistic sensation parameter extraction process (step S106).

Then, the information processing apparatus 10 executes an output process for a variety of vibration data or sound data where a processing result of a realistic sensation parameter extraction process is reflected thereon (step S107). Then, the information processing apparatus 10 determines whether or not an XR content is ended (step S108), and ends a process in a case where it is determined that such an XR content is ended (step S108; Yes).

Furthermore, in a case where the information processing apparatus 10 determines, in determination at step S108, that an XR content is not ended (step S108; No), it transfers to a process at step S104 again.

As described above, an information processing apparatus 10 according to an embodiment includes a scene detection unit 123, a parameter extraction unit 125, and an output unit 126. The scene detection unit 123 detects a scene from an input content. The parameter extraction unit 125 extracts a realistic sensation parameter for wave control that corresponds to a scene that is detected by the scene detection unit 123.

The output unit 126 outputs a wave signal for a content that is emphatically processed by a realistic sensation parameter that corresponds to a scene and is extracted by the parameter extraction unit 125. Therefore, in the information processing apparatus 10 according to an embodiment, it is possible to attain efficiency improvement of setting of a realistic sensation parameter for improvement of a realistic sensation of a content.

As described above, an information processing apparatus 10 according to an embodiment includes a scene information DB 132 (an example of a storage unit), a content production unit 121 and a rendering process unit 122 (an example of a calculation unit), and a scene detection unit 123. The scene information DB 132 stores a conditional expression for detecting a scene from an input content. The content production unit 121 and the rendering process unit 122 calculates condition data for an item of a conditional expression from a content.

The scene detection unit 123 detects a scene of a content by using a conditional expression that is stored in the scene information DB 132 and condition data that are calculated by the content production unit 121 and the rendering process unit 122. Therefore, in the information processing apparatus 10 according to an embodiment, it is possible to attain efficiency improvement of setting of a realistic sensation parameter for improvement of a realistic sensation of a content.

As described above, an information processing apparatus 10 according to an embodiment includes a scene detection unit 123, a priority order setting unit 124, and a parameter extraction unit 125. The scene detection unit 123 detects a scene from a content. The priority order setting unit 124 sets a priority order for a scene that is detected by the scene detection unit 123.

The parameter extraction unit 125 extracts a realistic sensation parameter that corresponds to a scene that is determined depending on a priority order that is set by the priority order setting unit 124, as a realistic sensation parameter that is used for realistic sensation control. Therefore, in the information processing apparatus 10 according to an embodiment, it is possible to attain efficiency improvement of setting of a realistic sensation parameter for improvement of a realistic sensation of a content.

Meanwhile, although a case where a content is an XR content has been explained in an embodiment as described above, this is not limiting. That is, a content may be a 2D video and a sound, only a video, or only a sound.

An aspect of an embodiment aims to provide an information processing apparatus, an information processing system, and an information processing method where it is possible to attain efficiency improvement of setting of realistic sensation parameter for improvement of a realistic sensation of a content.

An information processing apparatus according to an aspect of an embodiment includes a scene detection unit, a parameter extraction unit, and an output unit. The scene detection unit detects a scene from an input content. The parameter extraction unit extracts a realistic sensation parameter for wave control that corresponds to a scene that is detected by the scene detection unit. The output unit outputs a wave signal for the content that is emphatically processed by a realistic sensation parameter that is extracted by the parameter extraction unit.

An information processing apparatus according to an aspect of an embodiment includes a storage unit, a calculation unit, and a scene detection unit. The storage unit stores a conditional expression for detecting a scene from an input content. The calculation unit calculates condition data for an item of the conditional expression from a content. The scene detection unit detects a scene of a content by using a conditional expression that is stored in the storage unit and condition data that are calculated by the calculation unit.

An information processing apparatus according to an aspect of an embodiment includes a scene detection unit, a priority order setting unit, and a parameter extraction unit. The scene detection unit detects a scene from a content. The priority order setting unit sets a priority order for the scene that is detected by the scene detection unit. The parameter extraction unit extracts a realistic sensation parameter that corresponds to a scene that is determined depending on a priority order that is set by the priority order setting unit, as a realistic sensation parameter that is used for realistic sensation control.

According to an aspect of an embodiment, it is possible to attain efficiency improvement of setting of a realistic sensation parameter for improvement of a realistic sensation of a content.

Embodiment (1-1)

An information processing apparatus, including: a scene detection unit that detects a scene from an input content;
a parameter extraction unit that extracts a realistic sensation parameter for wave control that corresponds to a scene that is detected by the scene detection unit; and
an output unit that outputs a wave signal for the content that is emphatically processed by a realistic sensation parameter that is extracted by the parameter extraction unit.

Embodiment (1-2)

The information processing apparatus according to Embodiment (1-1), wherein:
the parameter extraction unit includes a vibration parameter extraction unit that extracts a vibration parameter that controls a vibration device that applies a vibration to a user according to a content, as the realistic sensation parameter; and the output unit outputs a vibration signal that is emphatically processed by using the vibration parameter to a vibration device.

Embodiment (1-3)

The information processing apparatus according to Embodiment (1-2), wherein:
the vibration device is a device that provides a vibration to a seat;
the parameter extraction unit extracts the vibration parameter for each of a plurality of the vibration devices that are provided on the seat; and
the output unit outputs the vibration signal that is emphatically processed by using a vibration parameter that corresponds to each of the vibration devices.

Embodiment (1-4)

The information processing apparatus according to Embodiment (1-1), (1-2), or (1-3), wherein:
the parameter extraction unit includes a sound parameter extraction unit that extracts a sound parameter that emphasizes sound data of the content; and
the output unit outputs a vibration signal that is emphatically processed by using the sound parameter to a sound output device.

Embodiment (1-5)

The information processing apparatus (10) according to any one of Embodiments (1-1) to (1-4), including
a learning unit that learns a relationship between the scene and the realistic sensation parameter.

Embodiment (1-6)

An information processing system, including:
an information processing apparatus that reproduces an XR content;
a display apparatus that displays an video depending on a video signal that is output from the information processing apparatus;
a sound output device that generates a sound depending on a sound signal that is output from the information processing apparatus; and
a vibration device that vibrates depending on a vibration signal that is output from the information processing apparatus, wherein
the information processing apparatus includes:
a scene detection unit that detects a scene from an input XR content;
a parameter extraction unit that extracts a realistic sensation parameter for a sound process and a vibration process that corresponds to a scene that is detected by the scene detection unit; and
an output unit that outputs sound data and vibration data that are emphatically processed by using a realistic sensation parameter that is extracted by the parameter extraction unit to the sound output device and the vibration device, respectively.

Embodiment (1-7):+

An information processing method, wherein a wave signal for a wave device is emphatically processed, based on a scene of a content.

Embodiment (2-1)

An information processing apparatus, including:
a storage unit that stores a conditional expression for detecting a scene from a content;
a calculation unit that calculates condition data for an item of the conditional expression from a content; and
a scene detection unit that detects a scene of a content by using a conditional expression that is stored in the storage unit and condition data that are calculated by the calculation unit.

Embodiment (2-2)

The information processing apparatus according to Embodiment (2-1), wherein:
the scene detection unit includes a condition setting unit that sets the conditional expression; and
the storage unit stores the conditional expression that is set by the condition setting unit.

Embodiment (2-3)

The information processing apparatus according to Embodiment (2-1) or (2-2), wherein
an item of the conditional expression is a positional relationship between a user and a target in a content.

Embodiment (2-4)

The information processing apparatus according to Embodiment (2-1), (2-2), or (2-3), wherein
an item of the conditional expression is movement of a user in a content.

Embodiment (2-5)

The information processing apparatus according to any one of Embodiments (2-1) to (2-4), wherein
an item of the conditional expression is a space where a user is present in a content.

Embodiment (2-6)

The information processing apparatus according to any one of Embodiments (2-1) to (2-5), wherein
an item of the conditional expression is information of a time when a user is present in a content.

Embodiment (2-7)

An information processing system, including:
an information processing apparatus that reproduces an XR content;
a display apparatus that displays an video depending on video data that are output from the information processing apparatus;
a sound output device that generates a sound depending on sound data that are output from the information processing apparatus; and
a vibration device that vibrates depending on vibration data that are output from the information processing apparatus, wherein
the information processing apparatus includes:
a storage unit that stores a conditional expression for detecting a scene from a content;

a calculation unit that calculates condition data for an item of the conditional expression from a content; and a scene detection unit that detects a scene of a content by using a conditional expression that is stored in the storage unit and condition data that are calculated by the calculation unit.

Embodiment (2-8)

An information processing method, wherein:
condition data for an item of a conditional expression for detecting a scene from a content are calculated; and
a scene of a content is detected by using the conditional expression and calculated condition data.

Embodiment (3-1)

An information processing apparatus, including:
a scene detection unit that detects a scene from a content;
a priority order setting unit that sets a priority order for a scene that is detected by the scene detection unit; and
a parameter extraction unit that extracts a realistic sensation parameter that corresponds to a scene that is determined depending on a priority order that is set by the priority order setting unit, as a realistic sensation parameter that is used for realistic sensation control.

Embodiment (3-2)

The information processing apparatus according to Embodiment (3-1), wherein:
the parameter extraction unit includes a sound parameter extraction unit that extracts a sound emphasis parameter for a sound process and a vibration parameter extraction unit that extracts a vibration parameter for a vibration process; and
the priority order setting unit separately sets a priority order of a scene for each of the sound emphasis parameter and the vibration parameter.

Embodiment (3-3)

The information processing apparatus according to Embodiment (3-1) or (3-2), wherein
the priority order setting unit sets the priority order that is based on a detection timing for a scene.

Embodiment (3-4)

The information processing apparatus according to Embodiment (3-1), (3-2), or (3-3), wherein
the priority order setting unit sets the priority order that is based on a weight of a realistic sensation parameter.

Embodiment (3-5)

The information processing apparatus according to any one of Embodiments (3-1) to (3-4), wherein
the priority order setting unit sets the priority order that is based on a length of time of a scene.

Embodiment (3-6)

An information processing system, including:
an information processing apparatus that reproduces an XR content;

a display apparatus that displays an video depending on video data that are output from the information processing apparatus;
a sound output device that generates a sound depending on sound data that are output from the information processing apparatus; and
a vibration device that vibrates depending on vibration data that are output from the information processing apparatus, wherein
the information processing apparatus includes:
a scene detection unit that detects a scene from an XR content;
a priority order setting unit that sets a priority order for a scene that is detected by the scene detection unit;
a parameter extraction unit that extracts a realistic sensation parameter that corresponds to a scene that is determined depending on a priority order that is set by the priority order setting unit, as a realistic sensation parameter that is used for realistic sensation control; and
an output unit that outputs sound data and vibration data that are emphatically processed by using a realistic sensation parameter that is extracted by the parameter extraction unit to the sound output device and the vibration device.

Embodiment (3-7)

An information processing method, wherein:
a priority order is set for a scene that is detected from a content; and
a realistic sensation parameter that corresponds to a scene that is determined depending on a set priority order is extracted as a realistic sensation parameter that is used for realistic sensation control.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

What is claimed is:
1. An information processing apparatus, comprising a control unit configured to execute a process that includes:
receiving an input content that includes image data and sound data;
detecting a scene from the input content;
extracting a vibration parameter for vibration control that corresponds to the scene;
producing a vibration signal for the input content by processing the sound data of the input content by the vibration parameter without processing the image data of the input content; and
outputting the vibration signal, wherein:
the outputting of the vibration signal outputs the vibration signal to at least one vibration device;
the at least one vibration device is a plurality of vibration devices that provide a vibration to a seat;
the extracting extracts the vibration parameter for each of the plurality of vibration devices that are provided on the seat; and
the outputting outputs the vibration signal that is produced by processing the sound data of the input content by using a vibration parameter that corresponds to each of the plurality of vibration devices without processing the image data of the input content.

2. The information processing apparatus according to claim 1, wherein:
the extracting includes extracting a sound parameter for sound control of the sound data of the input content; and
the outputting includes outputting a sound signal to a sound output device, the sound signal being produced by processing the sound data of the input content by using the sound parameter.

3. The information processing apparatus according claim 1, wherein:
the control unit is configured to execute a learning process that learns a relationship between the scene and the vibration parameter.

4. The information processing apparatus according to claim 1, further comprising
a storage unit that stores a conditional expression for detecting a scene from the input content, wherein:
the control unit is configured to calculate condition data for an item of the conditional expression from the input content; and
the detecting includes detecting the scene of the input content by using the conditional expression that is stored in the storage unit and the condition data that is calculated.

5. The information processing apparatus according to claim 4, wherein:
the detecting includes setting the conditional expression; and
the storage unit stores the conditional expression that is set.

6. The information processing apparatus according to claim 4, wherein
the item of the conditional expression is a positional relationship between a user and a target in the input content.

7. The information processing apparatus according to claim 4, wherein
the item of the conditional expression is movement of a user in the input content.

8. The information processing apparatus according to claim 4, wherein
the item of the conditional expression is a space where a user is present in the input content.

9. The information processing apparatus according to claim 1, wherein:
the control unit is further configured to select a target for the vibration control in the scene that is detected;
the extracting includes extracting the vibration parameter for the vibration control that corresponds to the target that is selected; and
the outputting includes outputting the vibration signal for the input content that is produced by processing the sound data of the target that is selected in the input content by the vibration parameter without processing the image data of the input content.

10. An information processing method executed by a hardware processor, the method comprising
receiving an input content that includes image data and sound data;
detecting a scene from the input content;
extracting a vibration parameter for vibration control that corresponds to the scene;
producing a vibration signal for the input content by processing the sound data of the input content by the vibration parameter without processing the image data of the input content; and
outputting the vibration signal to at least one vibration device, wherein:
the at least one vibration device is a plurality of vibration devices that provide a vibration to a seat;
the extracting extracts the vibration parameter for each of the plurality of vibration devices that are provided on the seat; and
the outputting outputs the vibration signal that is produced by processing the sound data of the input content by using a vibration parameter that corresponds to each of the plurality of vibration devices without processing the image data of the input content.

11. The information processing method according to claim 10, wherein
the detecting includes detecting the scene from the input content by using a conditional expression for detecting a scene from the input content and condition data for an item of the conditional expression that is calculated from the input content.

12. The information processing method according to claim 10, wherein:
a priority order is set for scenes detected from the input content; and
the vibration parameter that corresponds to one of the scenes that is determined depending on the priority order that was set is extracted as the vibration parameter that is used for processing of the sound data of the input content to produce the vibration signal.

13. An information processing apparatus, comprising a control unit configured to execute a process that includes:
receiving an input content that includes image data and sound data;
detecting a scene from the input content;
extracting a vibration parameter for vibration control that corresponds to the scene;
producing a vibration signal for the input content by processing the sound data of the input content by the vibration parameter without processing the image data of the input content; and
outputting the vibration signal, wherein:
the control unit is configured to set a priority order for scenes detected by the detecting; and
the extracting includes extracting the vibration parameter that corresponds to one of the scenes that is determined depending on the priority order that was set, as the vibration parameter that is used for the vibration control.

14. The information processing apparatus according to claim 13, wherein:
the extracting includes extracting a sound parameter for sound control; and
the setting includes separately setting a priority order of a scene for each of the sound parameter and the vibration parameter.

15. The information processing apparatus according to claim 13, wherein
the setting includes setting the priority order that is based on a detection timing for each scene.

16. The information processing apparatus according to 18. claim 13, wherein
the setting includes setting the priority order that is based on a weight of the vibration parameter.

17. The information processing apparatus according to claim 13, wherein the setting includes setting the priority order that is based on a length of time of each scene.

* * * * *